United States Patent [19]
Gache

[11] 3,948,547
[45] Apr. 6, 1976

[54] PIPE COUPLINGS
[75] Inventor: Henry Gache, Annecy, France
[73] Assignee: Gedic, S.A., Saint-Jorioz, France
[22] Filed: July 11, 1975
[21] Appl. No.: 594,977

[30] Foreign Application Priority Data
July 12, 1974 France .............................. 74.25774

[52] U.S. Cl......... 285/317; 24/211 K; 285/DIG. 22; 403/328
[51] Int. Cl.$^2$ ........................................ F16L 37/08
[58] Field of Search............ 285/305, 317, DIG. 22; 403/328, 327, 326, 321, 322, 329; 24/211 K, 230 AN, 115 G; 85/5 M

[56] References Cited
UNITED STATES PATENTS

| | | | |
|---|---|---|---|
| 1,489,310 | 4/1924 | Critchlow ....................... | 285/305 X |
| 2,449,920 | 9/1948 | Williams .......................... | 285/305 X |
| 3,765,064 | 10/1973 | Hoober et al. ..................... | 24/211 K |

FOREIGN PATENTS OR APPLICATIONS

| | | | |
|---|---|---|---|
| 163,947 | 9/1949 | Austria ............................... | 285/305 |
| 1,396,434 | 3/1965 | France .............................. | 285/305 |
| 568,976 | 4/1945 | United Kingdom ................. | 285/305 |
| 199,484 | 11/1965 | Sweden .............................. | 285/305 |

*Primary Examiner*—Thomas F. Callaghan
*Attorney, Agent, or Firm*—Dowell & Dowell

[57] ABSTRACT

An automatic coupling for the joining of two pipes has a male element and a female element with an internal bore to receive the male element. The female element incorporates a locking member arranged to engage behind an annular shoulder on the male element, and retain the male element in the female. The locking member is slideable transversely to the bore in the female element, and has a keyhole shaped opening through it. The shoulder passes through the wider part of the keyhole opening after which a return spring engages the narrower part of the keyhole opening behind the shoulder.

To provide an automatic coupling action the narrower part of the keyhole opening has two doubly oblique surfaces. When the male element is inserted, a frusto conical leading surface to the shoulder bears on these doubly oblique surfaces and displaces the locking member against the return spring to allow the shoulder to pass through the wider part of the keyhole opening. The locking member is thus operated automatically, and does not have to be depressed by hand in a separate operation. A guide member prevents misalignment of the male element during coupling.

9 Claims, 3 Drawing Figures

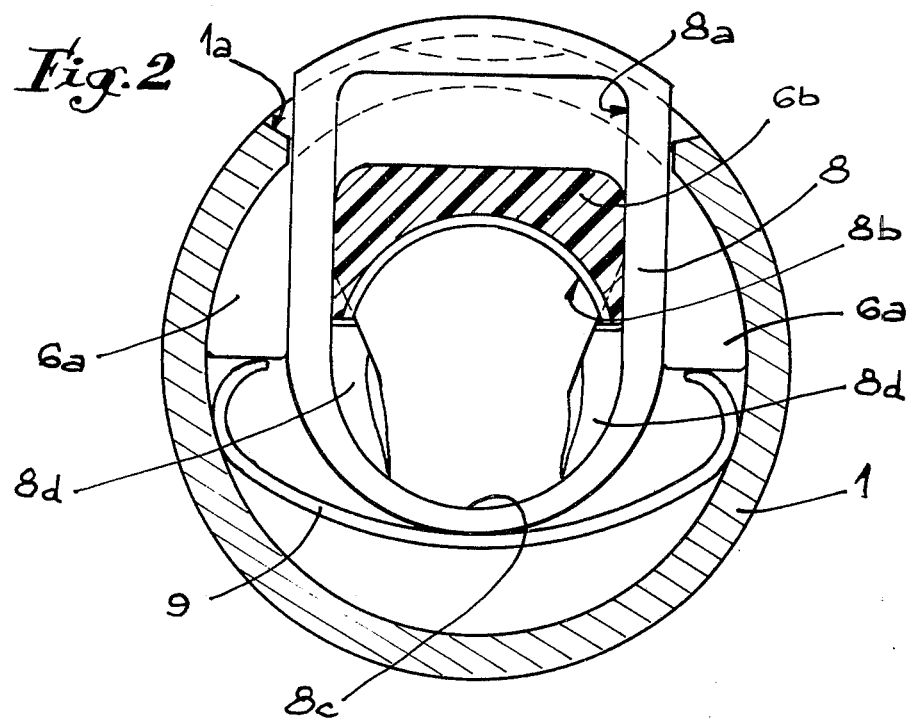
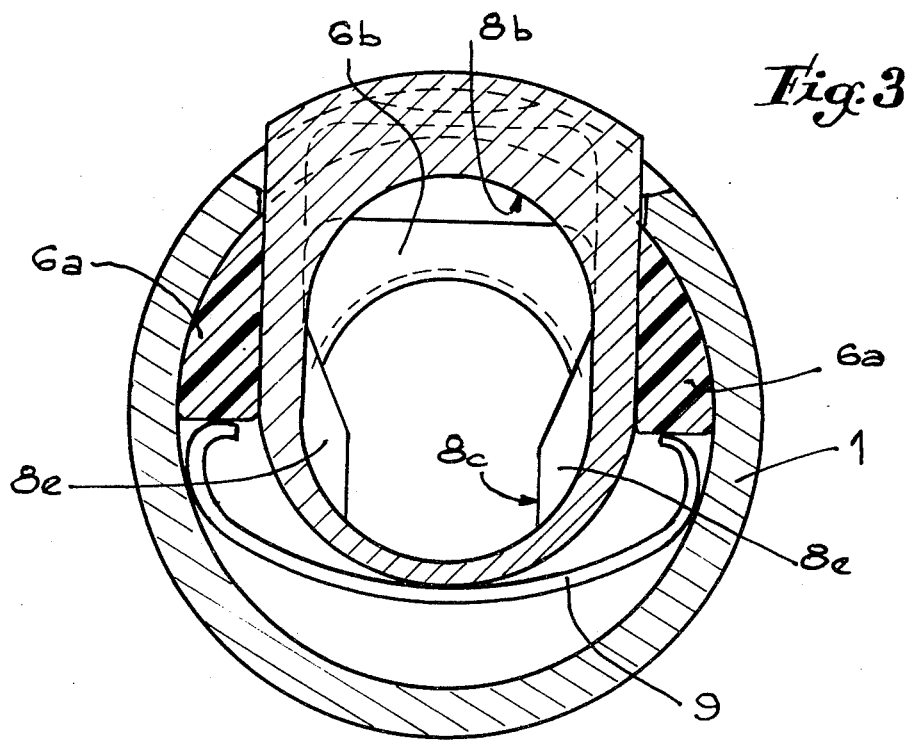

PIPE COUPLINGS

FIELD OF THE INVENTION

The present invention relates to improvements in quick couplings for non-permanent junctions in pipelines. More particularly it relates to couplings of the type in which the male element has cylindrical body with an annular shoulder and the female element encloses a locking member arranged to cooperate with the annular shoulder.

BACKGROUND OF THE INVENTION

A coupling of this type is known in which the female coupling element has an internal bore to receive a male element, and a locking member displaceable transversely to the bore against resilient return means, the locking member having a keyhole shaped opening through it in the direction of the bore, the narrow part of this opening normally being held in the bore by the return means and displacement of the locking member bringing the wider part of the keyhole shaped opening into alignment with the bore, so that a male element with a shoulder proximate its free end can be inserted into the bore, the shoulder passing through the wider part of the opening, subsequent return of the locking member by the return means bringing the narrower part of the opening around the male element on the opposite side of the shoulder to the free end to prevent uncoupling. Such a coupling element is referred to hereafter as an element of the kind described. When the elements are coupled the narrower part of the opening acts as a locking fork which is held in place by the resilient return means. Uncoupling is prevented by the annular shoulder of the male element abutting against it. Provided it has an appropriate shape such a locking member can operate equally well whether the annular shoulder on the male element has a flat rear wall transverse to the axis of the male element or a frustoconical rear wall. Such locking members are effective to hold the elements of the coupling in coupled condition in spite of swaying caused by oscillating movement of liquid under pressure which is passing through the coupling.

On the other hand, this arrangement does not give any automaticity in mating the two elements of the coupling. To insert the male element into the female it is necessary for the user to displace the locking member against the action of its return spring to bring the wider part of the keyhole opening into alignment with the bore. To remedy this inconvenience it has been suggested that the female element contains a slidable sleeve mounted to move axially within the female member on the opposite side of the locking member to the mouth of the female element, and which is urged by resilient means into engagement with the wider part of the keyhole opening as the male element is withdrawn in order to hold the locking element with its wider part in register with the coupling axis. Such an arrangement is satisfactory in principle but it considerably complicates the construction of the female element of the coupling and increases the cost price.

SUMMARY OF THE INVENTION

The object of the invention is to provide an arrangement permitting automatic coupling, but without unduly increasing the complexity of the coupling elements. To this end there is provided a female coupling element of the kind described above in which there are doubly oblique opposed side surfaces at each side of the narrower part of the opening, such that on insertion into the bore of a male element whose shoulder has a frustoconical leading surface, the action of said leading surface bearing on said doubly oblique side surfaces automatically displaces said locking member to allow said shoulder to pass through it. It is not then necessary for the locking member to be displaced in a separate operation. Displacement of the locking member is achieved automatically as the male element is pushed into the bore of the female.

DESCRIPTION OF THE DRAWINGS AND AN EMBODIMENT

The attached drawing shows by way of example one embodiment of a coupling according to the invention.

FIGS. 2 and 3 are transverse sections on the line II—II and III—III respectively of FIG. 1.

Figure 1:
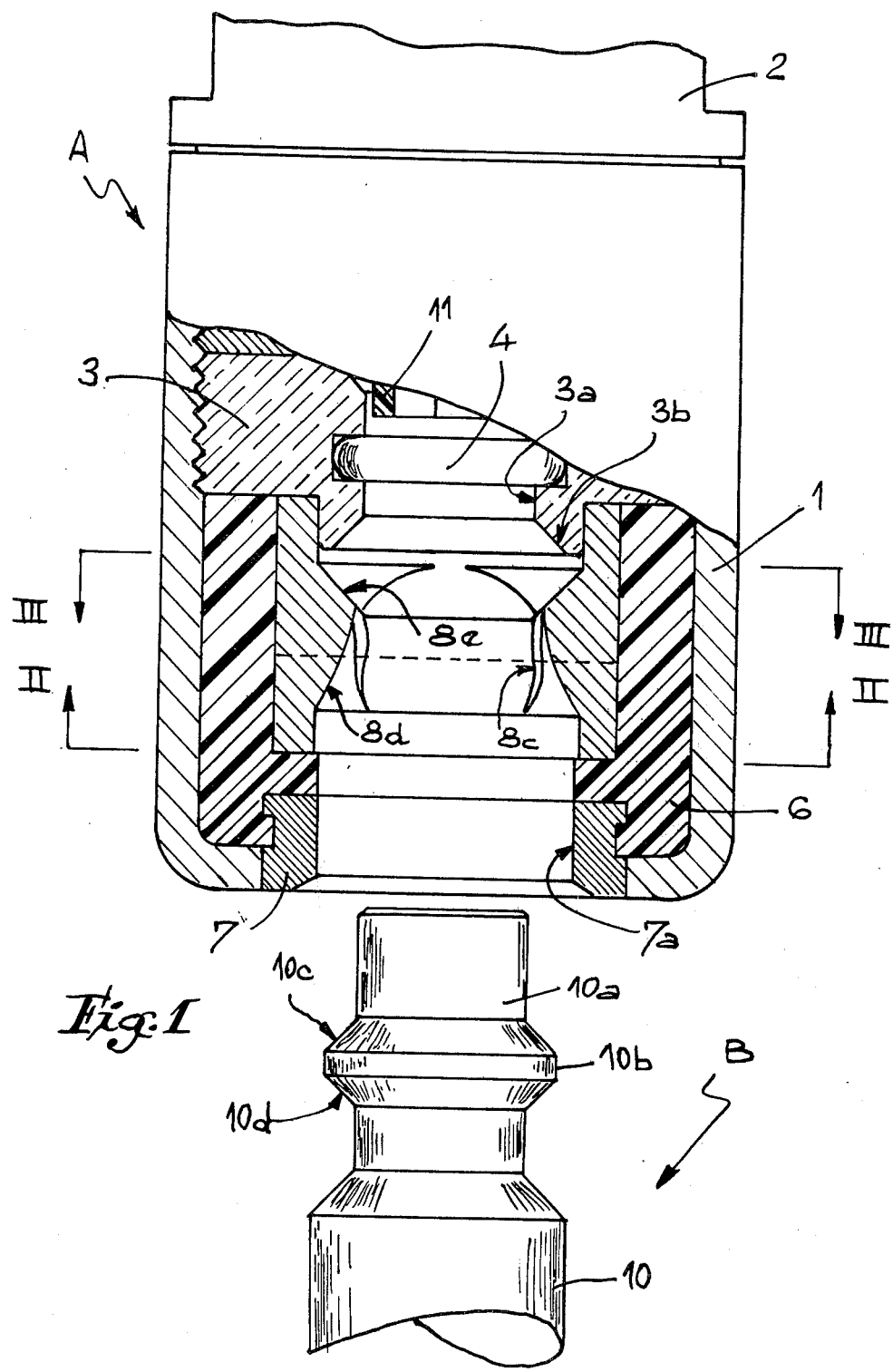
FIG. 1 is a schematic axial section of the coupling, the two elements being shown uncoupled.

Referring to the drawings, the coupling is formed by a female element A and a cooperating male element B. The body of the female element A is an assembly of two generally cylindrical parts 1 and 2, the part 2 serving as the termination of one of the pipes to be coupled. Part 1 of the female element encloses a ring 6 of synthetic plastics material which is held in place by a screw threaded retaining member 3. The retaining member 3 has a central axial bore 3a in which there is fixed a sealing ring 4. A socket 7 at the mouth of the part 1 is fast with the ring 6 and has a central bore 7a. A locking member 8 is mounted between part of the ring 6 and the retaining member 3. The locking member 8 is slidable transversely relative to the axis of the element A. It can be displaced into the part 1 against the action of a return spring 9. It is exposed through an access opening 1a in the cylindrical wall of the part 1 so that it can be displaced by direct manual pressure against the return spring. As best seen in FIGS. 2 and 3, the spring 9 is a leaf spring located by its ends which bear against the abutments 6a integral with and extending from the ring 6.

The front face of the locking member 8, i.e. the face which faces the mouth of the female element, is provided with an internal recess 8a. A part 6b also integral with and extending from the ring 6 fits into this recess, and acts as a member guiding insertion of the male element. The locking member 8 has a keyhole shaped opening extending through it in the direction of the axis of the bores 3a and 7a, i.e. perpendicular to the direction of displacement of the locking member. The opening has a wider upper part 8b of a part circular shape and a narrower lower part 8c. At the front of the locking member facing the mouth of the female element, the opposed walls which edge the narrow part 8b of the opening are shaped rather like a funnel, providing two doubly oblique surfaces 8d. The surfaces 8d contain a narrowing towards each other in two directions, firstly inwardly from the front surface parallel to the axis of the bores, and secondly, away from the wider part of the keyhole opening, transverse to the axis. At its opposite or rear surface the locking member 8 has, around the narrow part 8c, a frustoconical shape providing two centering facets 8e (FIG. 3).

The associated male element B has a cylindrical part 10 terminating the other of the pipes to be coupled. Extending forwardly from the part 10 is a cylindrical extension 10a having an annular shoulder 10b. Between the surface of the extension 10a and the surface of the shoulder 10b there are oppositely diverging frustoconical surfaces 10c and 10d.

The external diameter of the extension 10a of the male element B is very slightly less than both the diameter of the axial bore 3a in the retaining member 3 and the minimum width of the narrower part 8c of the keyhole opening in the locking member 8. The external diameter of the shoulder 10b is very slightly less than the diameter of the part-circular wider part 8b of the keyhole opening. The angle of conicity of the surface 10c is substantially identical to the angle of conicity of the facets 8e.

In the uncoupled condition the spring 9 urges the locking member 8 outwardly to abut against an annular boss 3b on the retaining member 3. In this position, which may be termed the raised position, the axis or centre of the part-circular wider part 8b of the keyhole opening is positioned radially outwardly relative to the common axis of the bores 7a and 3a of the socket 7 and retaining member 3. In use, when the user pushes the two elements of the apparatus together to couple the two pipes, the free end of the extension 10a on the male element B is guided by the guide member 6b of the ring 6 and goes through the narrow part 8c of the keyhole opening. The leading frustoconical surface 10c of the shoulder 10b bears against the doubly oblique surfaces 8b and the locking member is displaced into the part 1 against the spring 9. The locking member is displaced in this way by a sufficient amount to bring the part-circular wider part 8b of the keyhole opening into register with the bore 7a, its centre then being coincident (or very nearly so) with the axis of the bores 3a and 7a.

The guide member 6b serves to retain the male element in axial alignment with the bores 7a and 3a, while surface 10c is being urged against the surfaces 8b. The reaction to this would tend to displace the male element radially towards the wider part of the keyhole opening before this has come into register with the bore 7a. The guide member 6b prevents such radial displacement.

The shoulder 10b passes through the wider part 8b of the keyhole opening. The free end of the extension 10a enters the bore 3a, engaging the sealing ring 4 in fluid tight manner.

After the shoulder 10b has passed through the part 8b of the keyhole opening, the spring 9 returns the locking member to its original raised position and the male element A is then axially retained in the female element B. The shoulder 10b is blocked axially by the lateral edges of the narrower part 8c of the keyhole opening which is thus acting like a fork to engage the cylindrical extension 10a behind its shoulder 10b, and acts to prevent the male and female elements becoming uncoupled at the wrong time through the action of any axial traction forces which they may undergo during use. To uncouple the two elements A and B the locking member 8 is displaced manually (access for the purpose being provided by the opening 1a) to bring the part 8b of the keyhole opening into alignment with the bores 7a and 3a. The surface 10d of the shoulder 10b bearing on the facets 8e assists in bringing the part 8a of the keyhole opening into alignment to allow the shoulder to pass through it.

The spring 9 afterwards returns the locking member 8 to its raised position.

If desired the female element A can be provided with a biased shutoff valve 11 (FIG. 1) which in known fashion is pushed into its open position by the free end of the extension 10a on coupling. The annular shoulder 10b need not have a frustoconical surface 10d, but could have a planar surface perpendicular to the axis of the male element. The cooperating female element may then have facets 8e on the keyhole opening in the locking member which are in perpendicular to the axis of the female element.

I claim:

1. In a pipe coupling having a female coupling element of the kind having an internal bore to receive a male element, and a locking member displaceable transversely to the bore against resilient return means, the locking member having a keyhole shaped opening through it in the direction of the bore, the narrow part of this opening normally being held in the bore by the return means and displacement of the locking member bringing the wider part of the keyhole shaped opening into alignment with the bore, so that a male element with a shoulder proximate its free end can be inserted into the bore, the shoulder passing through the wider part of the opening, subsequent return of the locking member by the return means bringing the narrower part of the opening around the male element on the opposite side of the shoulder to the free end to prevent uncoupling, the improvement in the female coupling element which comprises doubly oblique opposed side surfaces at each side of the narrower part of the opening, such that on insertion into the bore of a male element whose shoulder has a frustoconical leading surface, the action of said leading surface bearing on said doubly oblique side surfaces automatically displaces said locking member to allow said shoulder to pass through it.

2. Coupling according to claim 1 in which said doubly oblique side surfaces have the shape of a funnel.

3. Coupling according to claim 1 wherein the female coupling element further comprises a guide member for said male element during insertion into said female element, said guide member being positioned to prevent radial displacement of said male element by reaction to said leading surface bearing on said doubly oblique side surfaces.

4. Coupling according to claim 3 wherein the female coupling element has an internal ring, and said guide member is integral with said ring.

5. Coupling according to claim 4 wherein said return means is a leaf spring, having a pair of ends, and wherein said internal ring has a pair of abutments integral with and extending from it, and said ends of said leaf spring bear against said abutments.

6. An automatic pipe coupling for the non-permanent joining of two pipes, the coupling having a female element terminating one pipe to be joined and a male element terminating the other pipe to be joined, the male element comprising:

a cylindrical end portion terminating at a free end, and an annular shoulder on said cylindrical end portion proximate said free end but spaced from it, said shoulder having a maximum diameter, and leading and trailing surfaces extending between said maximum diameter and said cyindrical end portion and either side of said maximum diameter, said leading surface extending from said maximum diameter towards at least said leading surface being of frustoconical form;

the female element comprising:

a cylindrical part terminating at a free end, an open mouth at said free end of said cylindrical part, a generally cylindrical bore extending inwardly into said cylindrical part from said mouth to receive the end portion of the male element, a locking member mounted in said cylindrical part, and extending transversely across said bore, and having a front face facing said mouth, a rear face on the side opposed to said front face, and an opening through it in the direction of said bore, said opening being of keyhole shaped outline with a wider part and a narrower part the wider part being part-circular and of diameter slightly greater than that of said maximum diameter of said shoulder on the male element, the narrower part being of width less than said maximum diameter of said shoulder, but greater than the diameter of said cylindrical end portion, and having opposed side edges, said edges having doubly oblique surfaces extending inwardly from said first face, resilient return means, said locking member being displaceable transversely to said bore against said return means, and an access opening in said cylindrical part, through which access may be gained to said locking member, for manual displacement thereof against said return means the return means normally maintaining the locking member in alignment with the narrower part of the opening in the bore, but displacement of the locking member bringing the wider part into line with the bore, on insertion of the male element into the female, the leading frustoconical surface of the shoulder bearing on said doubly oblique surfaces and thereby automatically displacing the locking member to bring the wider part into line with the bore and permit said maximum diameter of said shoulder to pass through the locking member, whereupon the return means returns the locking member and removal of the male element is prevented by said shoulder abutting said rear face of the locking member.

7. Coupling according to claim 6 in which said doubly oblique side surfaces have the shape of a funnel.

8. Coupling according to claim 7 wherein said cylindrical part of said female element contains an internal ring, said ring having a guide member and a pair of abutments integral with and extending from it, said guide member guiding the male element during insertion thereof and being positioned to block radial displacement of it by reaction to said leading surface bearing on said doubly oblique side surfaces, said resilient return means being a leaf spring having a pair of ends, said ends bearing on said abutments, and wherein said generally cylindrical bore contains a sealing ring for sealing said bore to the male element in fluid tight manner.

9. Coupling according to claim 6 wherein said trailing surface of said shoulder on said male element is frustoconical and extends from said maximum diameter away from said free end of said cylindrical portion, and wherein said rear face of said locking member, at each side of said narrower part of said keyhole shaped opening therein, has facets which are part of a frustoconical surface, and which assist in aligning said wider part of said opening with said bore in said female element on removal of said male element therefrom.

* * * * *